US012574092B2

(12) United States Patent
Ganti et al.

(10) Patent No.: US 12,574,092 B2
(45) Date of Patent: Mar. 10, 2026

(54) LOW OVERHEAD PROCEDURES FOR TWO-SIDED MODEL MONITORING

(71) Applicant: INDIAN INSTITUTE OF TECHNOLOGY MADRAS (IIT Madras), Tamil Nadu (IN)

(72) Inventors: Radhakrishna Ganti, Chennai (IN); Venkata Siva Sai Prasad Pirati, Chennai (IN); Anil Kumar Yerrapragada, Chennai (IN); Jeeva Keshav Sattianarayanin, Puducherry (IN)

(73) Assignee: INDIAN INSTITUTE OF TECHNOLOGY MADRAS (IIT MADRAS), Chennai (IN)

( * ) Notice: Subject to any disclaimer, the term of this patent is extended or adjusted under 35 U.S.C. 154(b) by 0 days.

(21) Appl. No.: 18/900,238

(22) Filed: Sep. 27, 2024

(65) Prior Publication Data

US 2025/0125851 A1 Apr. 17, 2025

(51) Int. Cl.
*H04B 7/06* (2006.01)
*H04B 17/391* (2015.01)

(52) U.S. Cl.
CPC ....... *H04B 7/0626* (2013.01); *H04B 17/3913* (2015.01)

(58) Field of Classification Search
CPC .......................... H04B 7/0626; H04B 17/3913
See application file for complete search history.

(56) References Cited

U.S. PATENT DOCUMENTS

2006/0094373 A1* 5/2006 Hottinen .............. H04B 7/0639
455/562.1
2023/0261704 A1* 8/2023 Meng ................... H04B 17/309
370/329

(Continued)

FOREIGN PATENT DOCUMENTS

WO WO-2024231766 A1 * 11/2024 ........... H04B 7/0478

*Primary Examiner* — Janice N Tieu
(74) *Attorney, Agent, or Firm* — Womble Bond Dickinson (US) LLP

(57) ABSTRACT

The disclosure describes a method of evaluating performance of a two-sided model used for performing CSI compression. The method includes receiving, by a network, from a UE, a compressed channel $H_t$, a second eigenvector $EV_{t+1}$ corresponding to a channel $H_{t+1}$, and a first similarity score determined between a first eigenvector $EV_t$ and the second eigenvector $EV_{t+1}$. A channel $H_t$ is reconstructed by processing the compressed channel $H_t$ using a decoder part of the two-sided AI/ML model. Eigen decomposition of the channel $H_t$ is performed to obtain an eigenvector $(EV)_t$. A second similarity score is determined between the eigenvectors $(EV)_t$ and $EV_{t+1}$. Alternatively, the first similarity score is determined between an estimated channel H and a codebook based precoder W, and a second similarity score is determined between a reconstructed channel H and the codebook based precoder W.

5 Claims, 3 Drawing Sheets

(56) References Cited

U.S. PATENT DOCUMENTS

2023/0412227 A1 * 12/2023 Abebe ................... H04L 1/0026
2024/0275438 A1 * 8/2024 Abebe ................. H04B 7/0456
2024/0284168 A1 * 8/2024 Elshafie ............. H04W 12/041

* cited by examiner

LOW OVERHEAD PROCEDURES FOR TWO-SIDED MODEL MONITORING

CROSS-REFERENCE TO RELATED APPLICATIONS

This application claims the benefit of Indian Patent Application No. 202341065833, filed 29 Sep. 2023 the disclosure of which is incorporated herein by reference in its entirety.

FIELD OF INVENTION

The invention generally relates to wireless communication systems, and in particular to methods of monitoring of AI/ML-based compression models in multi-antenna communication systems.

BACKGROUND OF THE INVENTION

In modern wireless communication systems, multiple antennas i.e., Multiple Input Multiple Output (MIMO) antennas are used. It is assumed that the wireless communication leverages the MIMO antennas and involves modulation and channel coding based on standardized schemes. Without loss of generality, one example of a transmitter is a cellular base station (Network or NW), and one example of a receiver is a User Equipment (UE). In order for the transmitter to adjust certain transmission parameters, information about characteristics of the wireless medium is required. Such information, referred to as Channel State Information (CSI), helps the transmitter to adjust modulation scheme, channel coding, radio resource allocation etc., thus achieving better throughput.

To obtain the CSI, a transmitter sends reference signals to a receiver, the receiver estimates the channel and computes channel quality metrics, and the receiver feeds the channel along with the metrics back to the transmitter.

Contents of a channel state feedback could range from the complete channel estimates to merely the quality metrics such as Precoding Matrix Indicator (PMI), Channel Quality Indicator (CQI), Rank Indicator (RI), Layer Indicator (LI) etc. A popular method for increasing throughput between the transmitter and receiver includes using the PMI, which maps to a precoder matrix in a pre-defined codebook (collection of pre-defined matrices that are known to both transmitter and receiver). This precoder when applied to subsequent transmissions, mitigates the effects of multi-path channels and interference. The PMI can have different granularities for different types of codebooks i.e., the size of the codebook increases (and therefore the number of PMIs) as the granularity increases. Thus, there is a trade-off between channel feedback overhead and more granular (accurate) channel state information. Furthermore, the feedback information is directly proportional to the number of transmission ports/ antennas that the transmitter has. Thus, in advanced wireless systems, where the number of antennas is of the order of tens or hundreds or higher, it is important to find solutions to compress the channel state feedback to minimize the overhead.

The codebook-based CSI feedback has certain limitations. Current state of the art codebooks (such as those used in 5G) exploit sparsity in the antenna domain and frequency domain to compress the channel matrix and/or its eigenvectors. However, the compression ratios as per the defined codebooks are limited. To achieve even better compression ratios, AI/ML based approaches are explored. Another motivating factor is the success of AI/ML in other domains such as image recognition and Natural Language Processing.

Typically, an AI/ML based architecture for CSI compression involves a two-sided model consisting of an encoder and a decoder. The encoder compresses information, and the decoder reconstructs the information. In the transmitter-receiver notion described above, the receiver uses the encoder to compress the true CSI (estimated channel) and the transmitter uses the decoder to reconstruct the compressed CSI. The two-sided model has two parts that should be deployed at two physically different locations (such as transmitter and receiver). These two parts could be trained either jointly or separately. Irrespective of the training mechanism, both parts of the model are required to operate together during inference. In other words, the input to the encoder of the two-sided model, such as CSI, could be measured at the receiver (for example, at UE) and the reconstruction of the CSI is done at the transmitter (for example, a base station). One essential component of the life cycle management of AI/ML models is periodic performance monitoring. In order to monitor the performance of the two-sided model, both input (ground truth CSI) and output (reconstructed CSI) are needed at one location. One way to fulfil such requirement includes (a) transferring the ground truth CSI to a location where the decoder is located (for example, the base station), (b) transferring the reconstructed CSI to the location where the encoder is located (for example, the UE), or (c) transferring the CSI reconstruction (decoder) model to the location where the encoder is located (for example, to the UE). All these approaches involve transmission of large overheads which consumes a large amount of bandwidth.

Therefore, there exists a need of an efficient mechanism using which the performance of the two-sided AI/ML models could be evaluated by consuming least amount of bandwidth.

OBJECTS OF THE INVENTION

An object of the invention is to provide a method of determining performance of an Artificial Intelligence/Machine Learning (AI/ML) model used for performing Channel State Information (CSI) compression in a wireless communication network.

Another object of the invention is to provide a method of determining performance of the AI/ML model using low overheads.

SUMMARY OF THE INVENTION

The summary is provided to introduce aspects related to a method of determining performance of an Artificial Intelligence/Machine Learning (AI/ML) model used for performing Channel State Information (CSI) compression. This summary is not intended to identify essential features of the claimed subject matter nor is it intended for use in determining or limiting the scope of the claimed subject matter.

In one embodiment, a method of determining performance of a two-sided AI/ML model for CSI compression is described. The method comprises receiving, by a network, from a UE, a compressed form of channel $H_t$, a second eigenvector $EV_{t+1}$ corresponding to a channel $H_{t+1}$, and a first similarity score determined between a first eigenvector $EV_t$ and the second eigenvector $EV_{t+1}$. The method further comprises reconstructing, by the network, a channel $\hat{H}_t$ by processing the compressed form of channel $H_t$ using a decoder part of the two-sided AI/ML model. The method further comprises performing, by the network, eigen decomposition of the channel $\hat{H}_t$ to obtain an eigenvector $\hat{E}V$. The method further comprises determining, by the network, a second similarity score between the eigenvectors $\hat{E}V$ and $EV_{t+1}$. The method further comprises comparing, by the network, the first similarity score and the second similarity score for evaluating performance of the two-sided AI/ML model.

In one aspect, the second similarity score may be transmitted to the UE side. The UE may compare the first similarity score and the second similarity score for determining performance of the two-sided AI/ML model.

In one aspect, the UE determines the first similarity score by:

performing a first estimation of a channel $H_t$ at time t,
performing eigen decomposition of the channel $H_t$ to obtain a first eigenvector $EV_t$ at time t; predicting the channel $H_{t+1}$ at time t+1;
performing an eigen decomposition of the channel $H_{t+1}$ to obtain the second eigenvector $EV_{t+1}$ at time t+1; and
comparing the first eigenvector $EV_t$ and the second eigenvector $EV_{t+1}$ for obtaining the first similarity score.

In one aspect, the UE sends, to the network, a ground-truth CSI report in a periodic, aperiodic, or semi-persistent manner.

In another embodiment, a method of determining performance of a two-sided AI/ML model for CSI compression is described. The method comprises receiving, by a network, from a UE, a compressed channel H, a Precoding Matrix Indicator (PMI) corresponding to the precoder W, and a first similarity score determined between the estimated channel H and the precoder W. The method further comprises processing, by the network, the compressed channel H using a decoder part of the two-sided AI/ML model to obtain a reconstructed channel 7. The method further comprises identifying, by the network, the precoder W using the PMI. The method further comprises determining by the network, a second similarity score between the reconstructed channel 12 and the precoder W. The method further comprises comparing, by the network, the first similarity score and the second similarity score for determining performance of the two-sided AI/ML model.

In one aspect, the second similarity score may be transmitted to the UE side. The UE may compare the first similarity score and the second similarity score for determining performance of the two-sided AI/ML model.

In one aspect, the first similarity score is determined by the UE by:

performing a first estimation of a channel H at time t;
identifying a precoder W, from a codebook, for determining best Signal to Interference and Noise Ratio (SINR); identifying the PMI corresponding to the precoder W; and comparing the channel H and the precoder W for determining the first similarity score.

Other aspects and advantages of the invention will become apparent from the following description, taken in conjunction with the accompanying drawings, illustrating by way of example the principles of the invention.

BRIEF DESCRIPTION OF THE DRAWINGS

The accompanying drawings constitute a part of the description and are used to provide further understanding of the present invention. Such accompanying drawings illustrate the embodiments of the present invention which are used to describe the principles of the present invention. The embodiments are illustrated by way of example and not by way of limitation in the figures of the accompanying drawings in which like references indicate similar elements. It should be noted that references to "an" or "one" embodiment in this invention are not necessarily made to the same embodiment, and they mean at least one. In the accompanying drawings.

Figure 1:
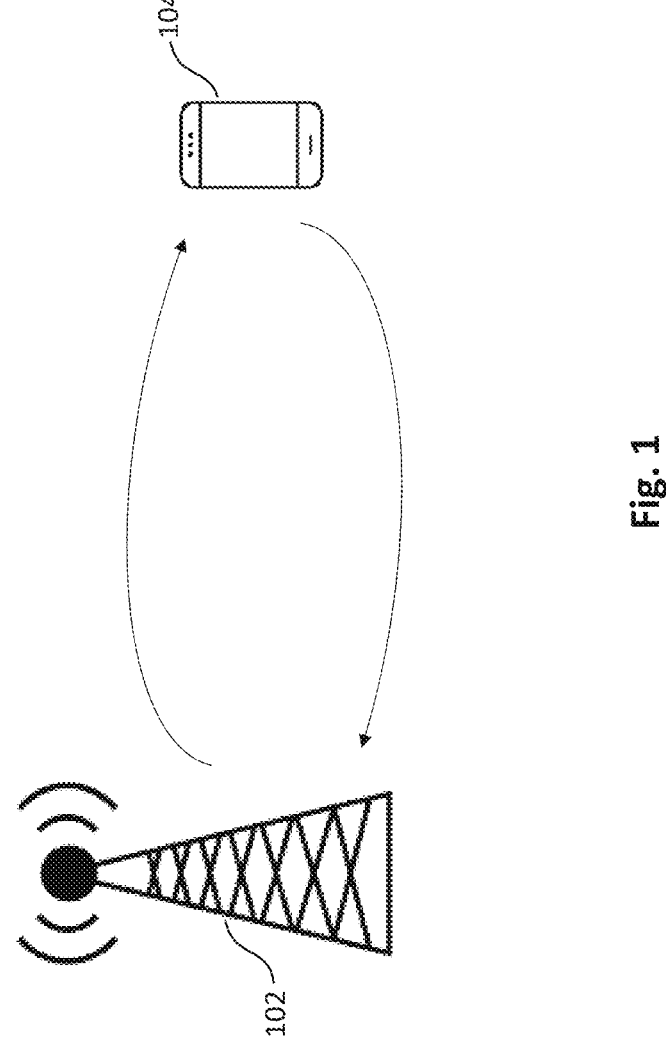
FIG. 1 illustrates a network diagram showing communication between a network/Base Station and a User Equipment (UE) for evaluating performance of a two-sided AI/ML model, in accordance with an embodiment of the present invention.

Complete understanding of the present invention and its embodiments thereof may be acquired by referring to the following description and the accompanying drawings.

DETAILED DESCRIPTION OF THE INVENTION

The detailed description set forth below in connection with the appended drawings is intended as a description of various embodiments of the present invention and is not intended to represent the only embodiments in which the present invention may be practiced. Each embodiment described in this invention is provided merely as an example or illustration of the present invention and should not necessarily be construed as preferred or advantageous over other embodiments. The detailed description includes specific details for the purpose of providing a thorough understanding of the present invention. However, it will be apparent to those skilled in the art that the present invention may be practiced without these specific details.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

Approximating language, as used herein throughout the specification and claims, may be applied to modify any quantitative representation that could permissibly vary without resulting in a change in the basic function to which it is related. Accordingly, a value modified by a term or terms, such as "less than," "approximately" etc. is not limited to the precise value specified. In some instances, the approximating language may correspond to the precision of an instrument for measuring the value.

The invention in its various embodiments proposes different methods or models for performance monitoring of two-sided models (such as those used for CSI compression). The methods may be implemented either at the network (NW)-side or the user equipment (UE)-side. Table 1 summarizes the multiple scenarios that arise in this implementation.

It is assumed that the UE's channel estimates (from ref signals such as CSI-RS) form the ground truth CSI (referred to as Target CSI). The UE-side model compresses the target CSI to form the encoded CSI.

FIG. 1 illustrates a network diagram showing communication between a network/Base Station 102 and a User Equipment (UE) 104 for evaluating performance of a two-sided AI/ML model, in accordance with an embodiment of the present invention.

In one embodiment, of NW-side monitoring, the UE 104 transmits encoded CSI as well as target CSI. The network 102 uses the encoded CSI as an input to its decoder to obtain reconstructed CSI. The network 102 calculates a monitoring KPI from the reconstructed CSI and the target CSI. In an alternative implementation of the method, the network-side

6 assumes that the network 102 and the UE 104 both use CSI prediction models that are equally well trained and model transfer may not happen for every monitoring instance.

In addition to the UE-side CSI compression model (Encoder) and its corresponding network-side CSI reconstruction model, the methods of the invention considers two more AI/ML models. In various embodiments, a UE-side CSI prediction model and a network-side CSI prediction model are proposed. The prediction models may be trained with ground truth CSI (channel estimation) data. During deployment, the UE-side prediction model is configured to make predictions based on the UE's channel estimations (target CSI) and the network-side prediction model makes predictions based on the NW's reconstructed CSI. The UE 104 may compute a similarity score between the UE-predicted CSI and the target CSI. The network 102 may compute a similarity score between the NW-predicted CSI and the reconstructed CSI. For network side monitoring, in addition to the encoded CSI, the UE 104 only needs to transmit the similarity score back to the network, thus reducing the overheads. Features of the proposed method are highlighted in blue in below provided Table 1, illustrating the reduced bandwidth requirement.

TABLE 1

| Performance Monitoring Entity | NW-side Measurement | NW-side Model Inference | UE-side Measurement | UE-side Model Inference | KPI Computation Entity | Data Content Over-the-Air and Direction | Latency (Transmissions) | Overhead (Bits) |
|---|---|---|---|---|---|---|---|---|
| NW | None | Reconstructed CSI | Estimated CSI (from Ref Signals) (Target CSI) | Encoded CSI | NW | Encoded CSI (UE to NW) Target CSI (UE to NW) | 1 UL | ~2000 bits (1000 for Encoded, 1000 for Target) |
| NW | None | None | Estimated CSI (from Ref Signals) (Target CSI) | Encoded CSI and Reconstructed CSI (Model Transfer) | UE | NW-side Reconstruction model (NW to UE) and KPI (UE to NW) | 1 DL and 1 UL | Order of 100K bits for Model Transfer and 10 s of bits for KPI |
| UE | None | Reconstructed CSI | Estimated CSI (from Ref Signals) (Target CSI) | Encoded CSI | UE | Encoded CSI (UE to NW) and Reconstructed CSI (NW to UE) | 1 UL and 1 DL | ~2000 bits (1000 for Encoded, 1000 for Target) |
| UE | None | NA | Estimated CSI (from Ref Signals) (Target CSI) | Encoded CSI and Reconstructed CSI (Model Transfer) | UE | NW-side Reconstruction Model (NW to UE) | 1 DL | Order of 100K bits for Model Transfer and 10 s of bits for KPI |
| NW | None | Reconstructed CSI and Predicted CSI (AI/ML or Conventional) | Estimated CSI (from Ref Signals) (Target CSI) | Encoded CSI and Predicted CSI (AI/ML or Conventional) | NW | Encoded CSI (UE to NW) and Similarity Score b/w Target CSI and Predicted CSI (UE to NW) | 1 UL | ~1000 bits for Encoded CSI and order of 10 s of bits for Similarity Score | monitoring involves the UE 104 computing the KPI and sending it back to the network 102. In such case, the network 102 transfers its decoder (an executable format suffices) to the UE 104 which then obtains the reconstructed CSI and calculates the KPI. In some implementations, the monitoring method may be implemented on the UE-side by similar procedures.

The invention proposes in various embodiments, methods to decrease overheads during implementation of the network monitoring methods. The method involves combining CSI compression and CSI prediction in a single step for reducing the performance monitoring overheads. The method A common algorithm is required to be used by a transmitter and a receiver to generate intermediate data to be used for comparing similarity between ground truth CSI and reconstructed CSI.

Figure 2:
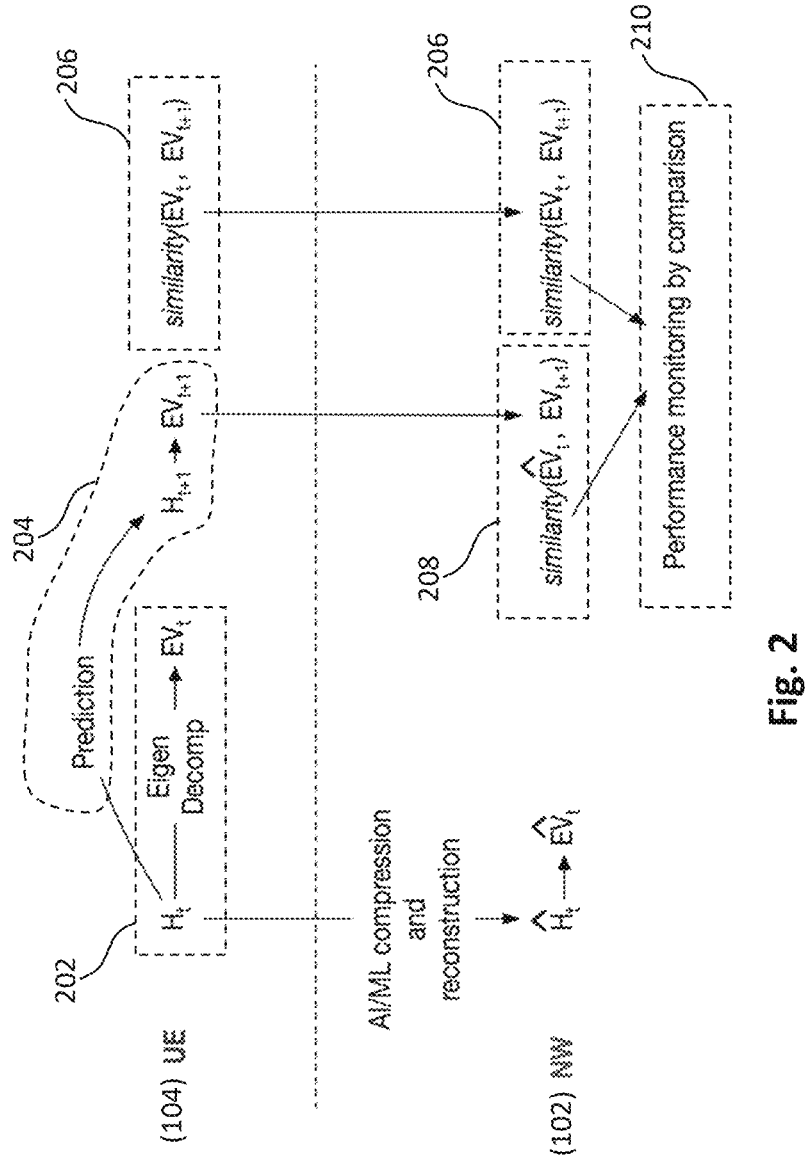
FIG. 2 illustrates an information flow diagram for evaluating performance of a two-sided AI/ML model based on temporal prediction, in accordance with an embodiment of the present invention.

FIG. 2 illustrates an information flow diagram for evaluating performance of a two-sided AI/L model based on temporal prediction, in accordance with an embodiment of the present invention. At step 202, the UE 104 performs a first estimation of a channel $H_t$ at time t and performs eigen decomposition to obtain a first eigenvector $EV_t$ at time t. At step 204, the UE 104 predicts a channel $H_{t+1}$ at time t+1 and performs eigen decomposition to obtain a second eigenvector $EV_{t+1}$ at time t+1. At step 206, the UE 104 determines a first similarity score between the first eigenvector $EV_t$ and the second eigenvector $EV_{t+1}$. Additionally, at step 206, the UE 104 compresses the channel $H_t$ using an encoder part of a two-sided AI/L model and transmits, to the network 102, a compressed channel along with the first similarity score and the second eigenvector $EV_{t+1}$. The network 102 reconstructs a channel $\hat{H}_t$ by processing the compressed channel using a decoder part of the two-sided AI/ML model, and performs eigen decomposition to obtain a third eigenvector $\hat{E}V$. At step 208, the network 102 determines a second similarity score between the third eigenvector $\hat{E}V$ and the second eigenvector $EV_{t+1}$. At step 210, the network 102 compares the first and second similarity scores determined at steps 206 and 208, for evaluating performance of the two-sided AI/ML model.

Figure 3:
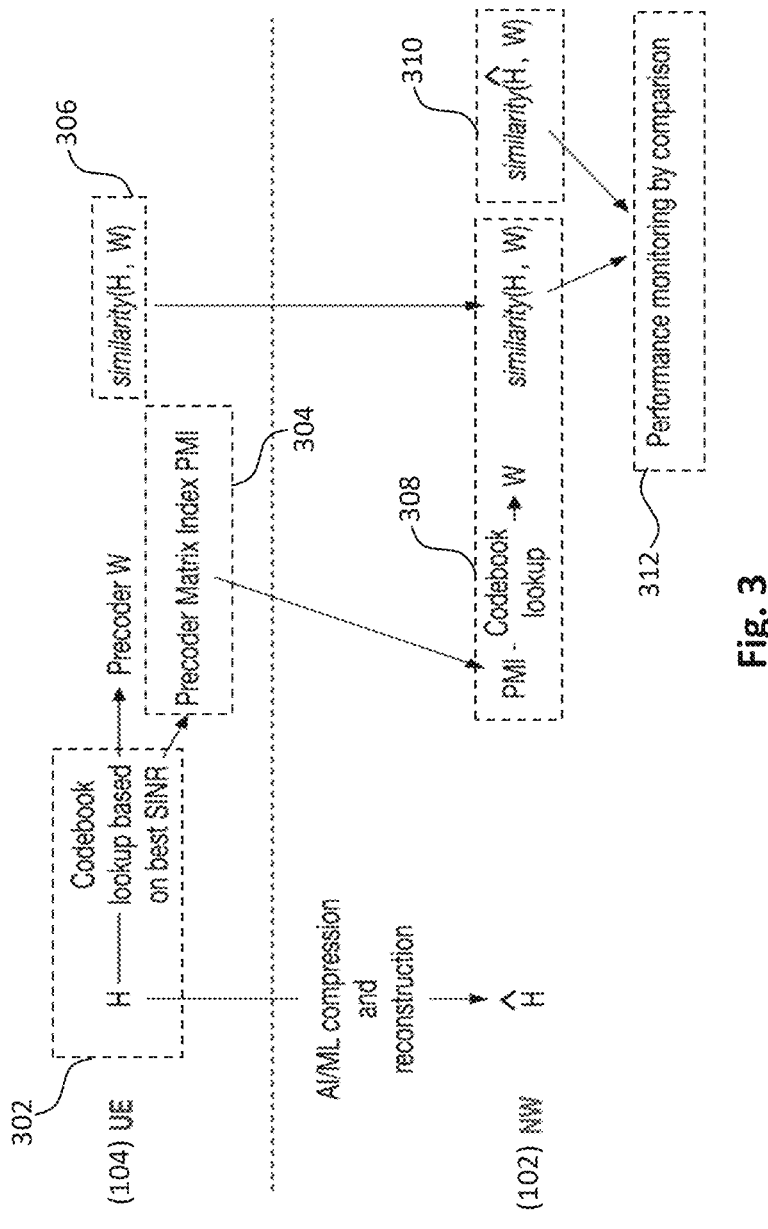
FIG. 3 illustrates an information flow diagram for evaluating performance of a two-sided AI/ML model using a codebook, in accordance with an embodiment of the present invention.

FIG. 3 illustrates an information flow diagram for evaluating performance of a two-sided AI/ML model using a codebook, in accordance with an embodiment of the present invention. At step 302, the UE 104 estimates a channel H and looks up a precoder W (in a codebook) for determining best Signal to Interference and Noise Ratio (SINR). At step 304, the UE 104 identifies a Precoding Matrix Indicator (PMI) corresponding to the precoder W. At step 306, the UE 104 determines a first similarity score between the channel H and the precoder W. The UE 104 compresses the channel H using an encoder part of the two-sided AI/ML model. At step 308, the UE 104 transmits, to the network 102, a compressed channel H, the PMI, and the first similarity score determined between the channel H and the precoder W.

The network 102 processes the compressed channel H using a decoder part of the two-sided AI/ML model to obtain a reconstructed channel 7. Also, the network 102 identifies the precoder W using the PMI received from the UE 104. Successively, at step 310, the network 102 determines a second similarity score between the reconstructed channel 14 and the precoder W. At step 312, the network 102 compares the first and second similarity scores determined at steps 308 and 310, to determine performance of the two-sided AI/ML model.

The terms "or" and "and/or" as used herein are to be interpreted as inclusive or meaning any one or any combination. Therefore, "A, B or C" or "A, B and/or C" may mean "any of the following: A; B; C; A and B; A and C; B and C; A, B and C." An exception to this definition will occur only when a combination of elements, functions, steps or acts are in some way inherently mutually exclusive.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set as claimed in claims that issue from this application, in the specific form in which such claims issue, including any subsequent correction.

We claim:

1. A method of determining performance of a two-sided artificial intelligence/machine learning (AI/ML) model, the method comprising:

receiving, by a network, from a user equipment (UE), a compressed form of channel $H_t$, a second eigenvector $EV_{t+1}$ corresponding to a channel $H_{t+1}$, and a first similarity score determined between a first eigenvector $EV_t$ and the second eigenvector $EV_{t+1}$;

reconstructing, by the network, a reconstructed channel $\hat{H}_t$ by processing the compressed form of channel $H_t$ using a decoder part of the two-sided AI/ML model for Channel State Information (CSI) compression;

performing, by the network, eigen decomposition of the reconstructed channel $\hat{H}t$ to obtain an eigenvector $\hat{E}V_t$;

determining, by the network, a second similarity score between the eigenvectors $\hat{E}V_t$ and $EV_{t+1}$; and comparing, by the network, the first similarity score and the second similarity score for evaluating performance of the two-sided AI/ML model.

2. The method as claimed in claim 1, wherein the first similarity score is determined by the UE by:

performing a first estimation of the channel $H_t$ at time t;

performing eigen decomposition of the channel $H_t$ to obtain the first eigenvector $EV_t$ at time t;

predicting the channel $H_{t+1}$ at time t+1;

performing an eigen decomposition of the channel $H_{t+1}$ to obtain the second eigenvector $EV_{t+1}$ at time t+1; and comparing the first eigenvector $EV_t$ and the second eigenvector $EV_{t+1}$ for obtaining the first similarity score.

3. The method as claimed in claim 1, further comprising transmitting, to the network, by the UE, a ground-truth CSI report in a periodic, aperiodic, or semi-persistent manner.

4. A method of determining performance of a two-sided artificial intelligence/machine learning (AI/ML) model, the method comprising:

receiving, by a network, from a user equipment (UE), a compressed channel H, a Precoding Matrix Indicator (PMI) corresponding to a precoder W, and a first similarity score determined between the compressed channel H and the precoder W;

processing, by the network, the compressed channel H using a decoder part of the two-sided AI/ML model for Channel State Information (CSI) compression, to obtain a reconstructed channel $\hat{H}$;

identifying, by the network, the precoder W using the PMI;

determining, by the network, a second similarity score between the reconstructed channel $\hat{H}$ and the precoder W; and comparing, by the network, the first similarity score and the second similarity score for determining performance of the two-sided AI/ML model.

5. The method as claimed in claim 4, wherein the first similarity score is determined by the UE by:

performing a first estimation of the channel Hat time t;

identifying the precoder W, from a codebook, for determining best Signal to Interference and Noise Ratio (SINR);

identifying the PMI corresponding to the precoder W; and comparing the channel H and the precoder W for determining the first similarity score.

* * * * *